Aug. 13, 1946.   K. M. LEDERER ET AL   2,405,892
INSTRUMENT BEARING
Filed May 10, 1941

Inventors:
Karl M. Lederer,
Alexander Dempster,
By Pierce & Scheffler,
Attorneys.

Patented Aug. 13, 1946

2,405,892

UNITED STATES PATENT OFFICE 2,405,892

INSTRUMENT BEARING

Karl M. Lederer, Newark, and Alexander Dempster, Linden, N. J., assignors to Weston Electrical Instrument Corporation, Newark, N. J., a corporation of New Jersey Application May 10, 1941, Serial No. 392,990

19 Claims. (Cl. 308—159)

This invention relates to instrument bearings, and particularly to bearings of the jewel type such as used in measuring and indicating instruments.

The conventional form of mounted sapphire jewel has a relatively wide flat surface between the centrally located pivot recess and an outer rim of metal that retains the sapphire disk upon the mounting screw or sleeve. This flat surface frequently results in damage to the pivot tip during assembly, as the jewels and pivots are often hidden by other instrument parts and the jewel screw may be adjusted while the pivot tip is seated upon the flat end surface of the jewel.

Objects of this invention are to provide instrument jewels and jewel mountings of novel shape that substantially reduce the danger of damage to the pivot tip during assembly of the moving system upon the jewel bearing. Objects are to provide an instrument bearing jewel having an enlarged and rounded head with a centrally located pivot recess, and a jewel bearing including such a jewel retained on a mounting sleeve or bushing by a metal ring or rim that is also rounded to eliminate flat surfaces upon which the pivot tip might be inadvertently seated during the assembly of the instrument movement upon the bearing. Further objects are to provide instrument bearing jewels of a high temperature plastic, and a method of manufacturing the same, that are characterized by a globular head on a cylindrical stem, and a pivot recess of predetermined geometry in the globular head and concentric with the stem axis.

These and other objects and advantages of the invention will be apparent from the following specification when taken with the accompanying drawing in which.

Figure 1:
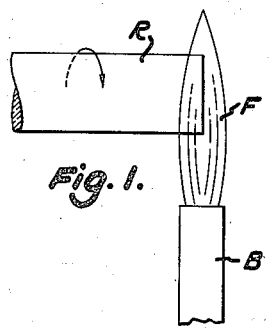
Figs. 1 to 3 are enlarged scale, schematic views illustrating successive steps in the manufacture of bearing jewels from a small rod of thermoplastic material.
Figure 2:
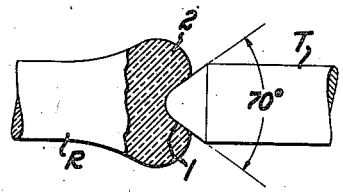
Figure 3:
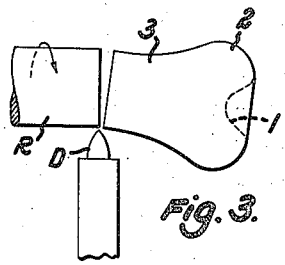

The known sapphire jewels and jewels formed by molding or sintering operations may be given the novel head shape contemplated by this invention but, as illustrated in Figs. 1–3, the jewels are conveniently and economically formed in the desired shape from rods of a material that is plastic at high temperatures and has the property of retaining, as it cools down and solidifies, the shape and polish of the stylus that is employed to impart a desired shape to the rod. Some steels, refractory metals and their carbides, quartz and some vitreous substances including hard glass are thermoplastic materials that may be used in the manufacture of jewels by pressing or stamping operations. Boro-silicate oven glasses such as those sold under the trade-mark "Pyrex" are quite satisfactory and, for convenience of description, it will be assumed that the rod is a hard glass that may be heated to a plastic condition in open air by a gas flame. Material that must be worked at higher temperatures or in a neutral atmosphere may be heated by an electric arc or its equivalent.

The glass rod R is supported in a chuck, not shown, and rotated with its tip end exposed to the flame F from a burner B until the tip is in a semi-molten condition. The rotation is stopped when the tip end reaches the proper temperature, and the accurately shaped and polished end of a small stylus or tool T is then forced axially into the heated glass rod to form a pivot seat 1 in the end of the rod. The semi-molten end of the rod R is upset by this operation and forms a convexly rounded or globular head 2 within which the pivot recess is substantially concentrically positioned. The inner end of the pivot recess is preferably rounded and the inclination of the opposite sides of the conical pivot recess may be of the order of 70°. The tool T is immediately withdrawn after the forming operation and, after cooling of the tip, the rod R is again revolved and a diamond cutter point D is touched against the rotating rod at a short distance from the globular head 2. A cylindrical shank 3, in axial alinement with the recess 1 of the globular head, is thus provided on the jewel that may be broken from the rod R at the line cut by the diamond point D.

Figure 4:
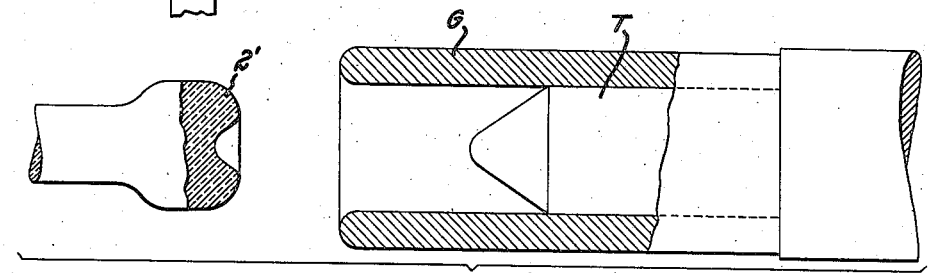
Figs. 4 and 5 are schematic views, similar to Fig. 2, illustrating other types of tools for the shaping of the jewel head.

The diameter of the head 2' of the jewel can readily be controlled by a cylindrical guide G that is mounted on and extends beyond the stylus T, see Fig. 4.

Figures 5, 6, 7:
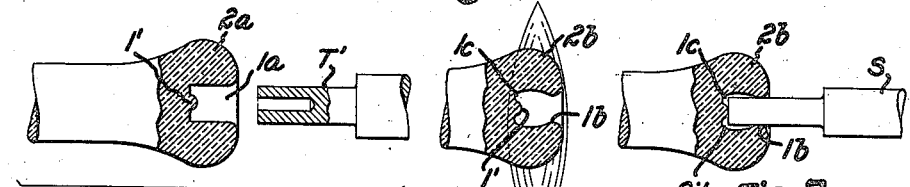
Fig. 6 is a schematic view illustrating the step of modifying the bearing recess of the Fig. 5 jewel.
Fig. 7 is a fragmentary side elevation, partly in section, of an instrument staff supported in a lubricated jewel bearing of the Fig. 6 type.

The novel method may be employed for the manufacture of other types of bearings by a proper selection of the shape of the stylus. As shown in Fig. 5, the stylus T' is a hollow cylinder for forming a cylindrical bearing recess 1a that terminates in a small boss 1'. The cavity within the stylus is of relatively great length, or is vented to the exterior, to avoid a flattening of the end boss 1' by the pressure of the air trapped within the stylus cavity. The end 2a of the rod is upset during the forming operation and assumes a globular form.

The jewel of Fig. 5 may be separated from the rod or the jewel head may first be subjected to a short application of heat, as illustrated schematically in Fig. 6, to contract the globular head 2b to a slightly smaller diameter. This reduction of the jewel head diameter contracts the outer part 1b of the cylindrical bearing recess but effects a progressively lesser reduction in the diameter of the inner portions of the bearing recess. The minimum diameter section 1b of the bearing recess forms a guide for a cylindrical shaft S, Fig. 7, and the enlarged diameter inner portion 1c forms a pocket for a minute amount of lubricant. This type of jewel is particularly adapted for use with vertically arranged shafts as the small boss 1' reduces the thrust friction to a minimum. A larger quantity of lubricant can of course be used when this jewel bearing is vertically arranged.

Figures 8, 9:
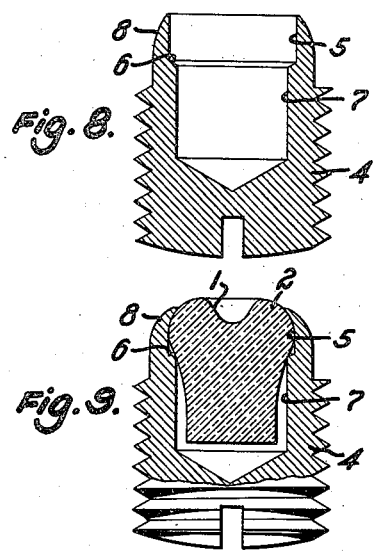
Fig. 8 is a central longitudinal section through a mounting for a globular headed jewel.
Fig. 9 is a side elevation, partly in central section, of a mounted jewel embodying the invention.

The mounting for a jewel of the enlarged head type may take the form of a screw 4, Fig. 8, that is counterbored from one end to provide a socket 5 for receiving the large diameter section of the jewel, and a conical seat 6 extending from the bore section 5 to a smaller diameter bore 7 in which the cylindrical stem 3 of the jewel is received. The cylindrical wall 8 of the bore section 5 is relatively thin, and may be rounded off at its outer end, for staking over the jewel to retain it in position on the conical seat 6. The end surface of the mounted jewel is approximately hemispherical, as is illustrated in Fig. 9, and there are no flat surfaces between the pivot recess and the outer edge of the mounting.

Figures 10, 11:
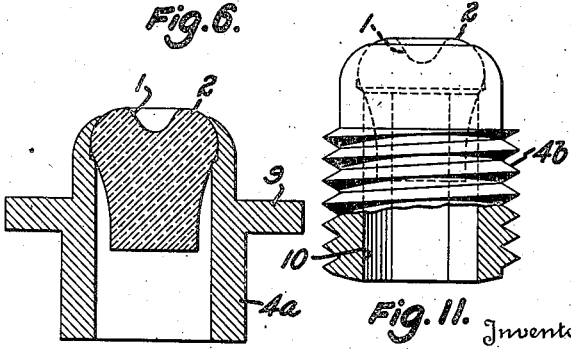
Figs. 10 and 11 are central longitudinal sections through other embodiments of the invention.

As shown in Fig. 10, the jewel mounting 4a may be an unthreaded sleeve with a radial flange 9 that may be pressed or otherwise secured to a bridge member.

As shown in Fig. 11, the mounting sleeve 4b may be an externally threaded tubular member having a non-circular bore 10, preferably of hexagonal cross-section as illustrated, into which a correspondingly shaped non-circular tool may be inserted to adjust the mounted jewel in a supporting member.

It is to be noted that mounted jewels of the illustrated types do not have flat end surfaces upon which the instrument pivot may rest during the axial adjustment of the jewel bearing. The pivot will slide radially of the jewel mounting in the event that it is not seated within the recess of the jewel, and damage to the pivot point during assembly is thereby substantially eliminated.

The described process of forming the jewel from a rod of high temperature plastic results in accurately formed and highly polished pivot recesses but it is to be understood that jewels of the novel shape herein shown and described may be formed by die pressing small unit masses of the thermoplastic material, or by the prior methods of grinding and polishing disks of sapphire or other appropriate materials.

We claim:

1. The process of forming an instrument bearing jewel which comprises heating the tip of a rod of a high temperature thermoplastic material to a semi-molten condition, forcing a stylus into and axially of the rod tip simultaneously to form a bearing recess and to upset the tip of the rod to form a head having a convexly rounded surface surrounding the recess, withdrawing the stylus from the heated rod tip, and cutting the rod to separate the recessed head therefrom after said head has cooled.

2. The process of forming an instrument bearing jewel as claimed in claim 1, in combination with the step of limiting the maximum diameter of the rounded head to a predetermined value during the upsetting of the rod tip.

3. The process as claimed in claim 1, wherein said stylus is forced into the rod to upset the heated tip to form a globular head, and the rod is cut at a point spaced from said globular head, whereby a cylindrical shank is provided on said jewel in substantially axial alinement with the bearing recess thereof.

4. The process of forming an instrument bearing jewel which comprises heating the tip of a rod of a high temperature thermoplastic material to a semi-molten condition, forcing a hollow cylindrical stylus into and axially of the rod tip to form a cylindrical recess having a boss at the base thereof, withdrawing the stylus from the rod tip, and cutting the rod to separate the recessed tip therefrom.

5. The process of forming an instrument bearing jewel which comprises heating the tip of a rod of a high temperature thermoplastic material to a semi-molten condition, forcing a hollow cylindrical stylus into and axially of the rod tip to form a cylindrical recess having a boss at the base thereof, withdrawing the stylus from the rod tip, contracting the outer portion of the cylindrical recess, and cutting the rod to separate the recessed tip therefrom.

6. The process of forming an instrument bearing jewel which comprises heating the tip of a rod of a high temperature thermoplastic material to a semi-molten condition, forcing a hollow cylindrical stylus into and axially of the rod tip to form a cylindrical recess having a boss at the base thereof, withdrawing the stylus from the rod tip, heating the recessed rod tip to contract the outer portion of the recess, and cutting the rod to separate the recessed tip therefrom.

7. The process of forming an instrument bearing which comprises shaping one end of a cylindrical body of bearing material to convexly rounded form, forming a bearing recess in and axially of the rounded end, mounting the shaped body in the counterbore of a supporting member, and bending the outer end of the supporting member over the rounded end of the shaped body to retain the shaped body within the supporting member and to impart a rounded outer surface to the portion of the supporting member surrounding the shaped body.

8. The process of forming an instrument bearing as recited in claim 7, wherein said body of bearing material is plastic at high temperatures, and said shaping and recessing steps comprise the heating of the end of the cylindrical body to a semi-molten condition, and the forcing of a stylus into and axially of the cylindrical body to upset the end of the body to globular form and simultaneously to form the bearing recess.

9. The process of forming an instrument bearing as recited in claim 7, wherein said body of bearing material is a refractory metal, and said shaping and recessing steps comprise the heating of the end of the cylindrical body to a semi-molten condition, and the forcing of a stylus into and axially of the cylindrical body to upset the end of the body to globular form and simultaneously to form the bearing recess.

10. The process of forming an instrument bearing as recited in claim 7, wherein said body of bearing material is quartz, and said shaping and recessing steps comprise the heating of the end of the cylindrical body to a semi-molten condition, and the forcing of a stylus into and axially of the cylindrical body to upset the end of the body to globular form and simultaneously to form the bearing recess.

11. The process of forming an instrument bearing as recited in claim 7, wherein said body of bearing material is glass, and said shaping and recessing steps comprise the heating of the end of the cylindrical body to a semi-molten condition, and the forcing of a stylus into and axially of the cylindrical body to upset the end of the body to globular form and simultaneously to form the bearing recess.

12. An instrument bearing jewel comprising a head portion having an axially located bearing recess therein, said recess having a maximum diameter at an intermediate portion thereof and a minimum diameter adjacent the face of the jewel, the diameter of the recess decreasing progressively from said maximum diameter portion towards the respective ends of the recess.

13. An instrument bearing jewel comprising a globular head on and axially alined with a shank, and a bearing recess in said head at the face thereof opposite said shank, said recess having an outer minimum diameter section adjacent said face of the head and an inner section expanding progressively from said minimum diameter section to a maximum diameter section at an intermediate point in the axial length of the recess.

14. An instrument bearing comprising a jewel having a convexly rounded head with a bearing recess formed therein, and a supporting member counterbored to provide a seat for receiving the jewel, the upper edge of the counterbored portion of the supporting member being bent over said jewel to retain the same on said seat.

15. In an instrument bearing, a mounting having a bore comprising an outer large diameter section connected to an inner smaller diameter section by an intermediate section, a jewel comprising a recessed enlarged head at the end of a cylindrical shank, the enlarged head of the jewel being seated upon the said intermediate section of the bore, and means for retaining the jewel on the mounting.

16. An instrument bearing comprising a hollow bushing having a counterbored end, and a globular head jewel seated in said bore, the end of the counterbored portion of the bushing being staked over the jewel to retain the same on said bushing.

17. An instrument bearing as claimed in claim 16 wherein the hollow bushing is externally threaded and has a non-circular bore, whereby a correspondingly shaped non-circular tool may be inserted into the non-circular bore to rotate the bushing on a supporting member.

18. An instrument bearing comprising a sleeve having a bore comprising an outer large diameter section connected to an inner smaller diameter section by an inclined shoulder, a jewel having a recessed enlarged head seated upon said shoulder and a cylindrical shank extending into the smaller diameter section of the bore, and means comprising the upper inturned end of said sleeve for securing the jewel to the sleeve.

19. An instrument bearing as claimed in claim 18, wherein said sleeve is externally threaded for securing the same to a threaded support.

KARL M. LEDERER.
ALEXANDER DEMPSTER.